United States Patent [19]

Beddows

[11] Patent Number: 5,435,587
[45] Date of Patent: Jul. 25, 1995

[54] COUPLING DEVICES

[76] Inventor: Peter M. Beddows, The Stables, Brogyntyn, Oswestry SY10 7DB, United Kingdom

[21] Appl. No.: 357,237

[22] Filed: Dec. 13, 1994

Related U.S. Application Data

[63] Continuation of Ser. No. 57,633, May 7, 1993, abandoned.

[51] Int. Cl.$^6$ .................................. B60D 1/06
[52] U.S. Cl. ......................... 280/477; 280/511
[58] Field of Search .................................. 280/477

[56] References Cited

U.S. PATENT DOCUMENTS

| | | | |
|---|---|---|---|
| 4,560,183 | 12/1985 | Cook | 280/477 |
| 4,657,275 | 4/1987 | Carroll | 280/477 |
| 4,657,276 | 4/1987 | Hamerl | 280/477 |
| 4,792,151 | 12/1988 | Feld | 280/406.1 |
| 4,844,496 | 7/1989 | Webb et al. | 280/477 |
| 4,844,497 | 7/1989 | Allen | 280/477 |
| 4,903,978 | 2/1990 | Schrum, III | 280/477 |
| 4,961,590 | 10/1990 | Davenport | 280/477 |
| 5,080,386 | 1/1992 | Lazar | 280/477 |

FOREIGN PATENT DOCUMENTS 2170769 8/1986 United Kingdom .

*Primary Examiner*—Mitchell J. Hill
*Attorney, Agent, or Firm*—Cushman Darby & Cushman

[57] ABSTRACT

An alignment guide 1 is described which aids in aligning and coupling vehicles and trailers and the like. It is adapted for attachment to a first coupling part C1 of a vehicle/trailer coupling device C1, C2. Part C1 may be a towing bar of a vehicle/trailer coupling device, and part C2 may include a socket B1 which engages over a partially spherically-shaped top A1 of the device C1. The alignment guide 1 has a ramp 2 with tapered side wings 3 to guide the part C2 into coupling engagement with the part C1. The alignment guide 1 can be moved to a stored position on part C1 when not in use.

22 Claims, 4 Drawing Sheets

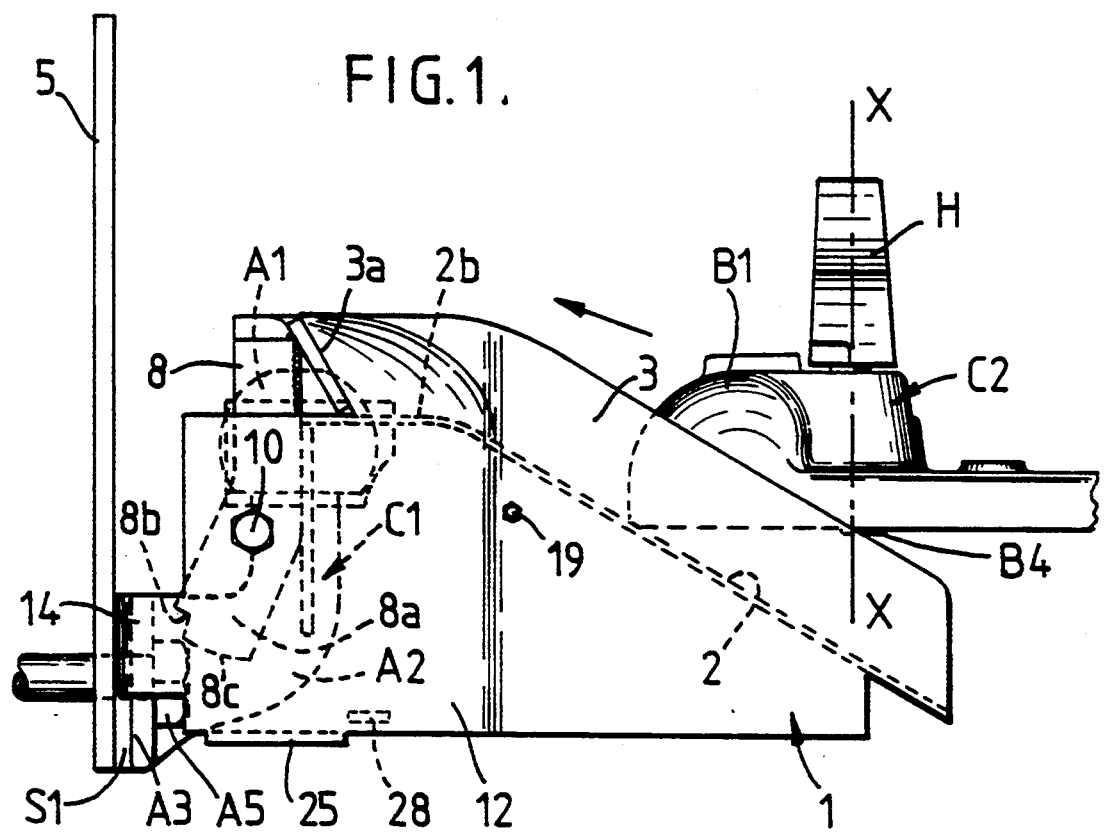
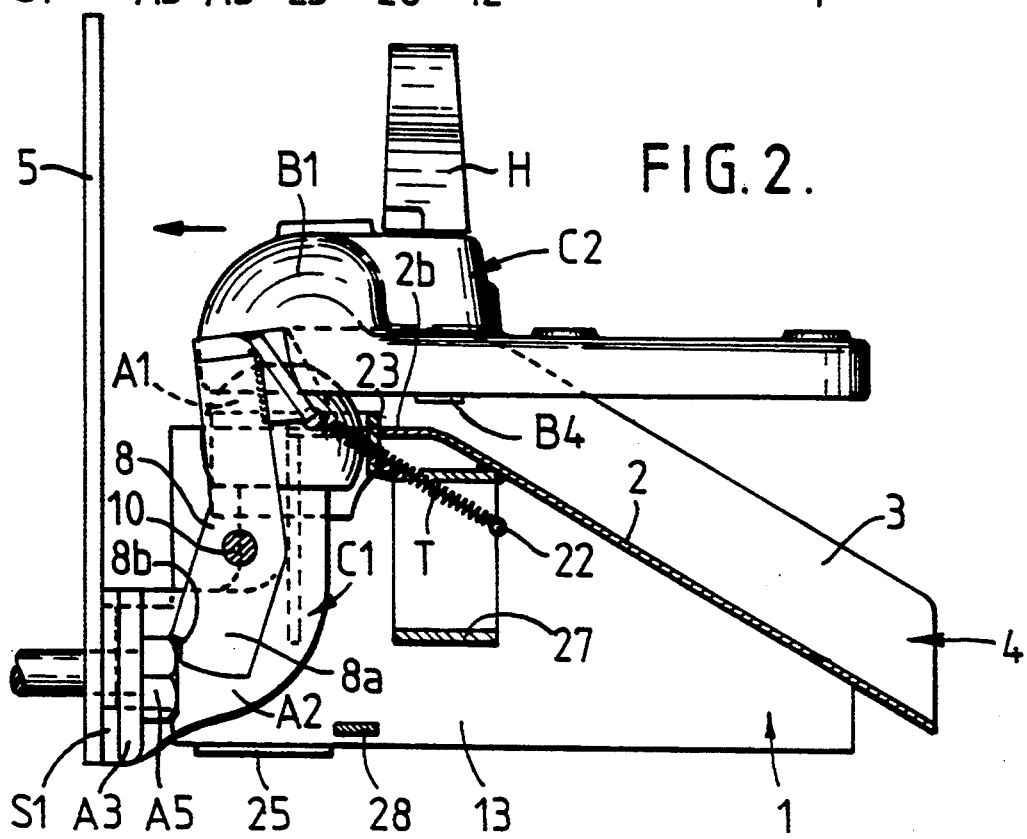

COUPLING DEVICES

This is a continuation of application Ser. No. 08/057,633, filed on May 7, 1993, which was abandoned upon the filing hereof.

BACKGROUND OF INVENTION

1. Field of the Invention

This invention relates to improvements in or relating to coupling devices more particularly, but not exclusively, it relates to such devices employed on a vehicle and trailer for coupling the trailer to the vehicle.

2. Description of Related Art

Problems tend to be encountered whenever trailers are coupled to vehicles, more particularly, problems are encountered in easily aligning (usually both horizontally and vertically) a coupling part on the vehicle with a coupling part positioned on the trailer, prior to locking the two coupling parts of the coupling device to one another. Often a degree of "guess-work" manoeuvering is required by the driver of the vehicle in order to position the vehicle coupling part proximate the trailer coupling part, and usually the driver of the vehicle will require assistance by a second person observing the manoeuvre and calling out guidance instructions (and assistance may also be required by a third person to help lift a heavily loaded trailer coupling). Therefore, it is believed that coupling of the trailer is effected by a somewhat "hit and miss" or "trial and error" approach which is certainly much more difficult if the driver of the vehicle does not have any assistance from a second person to lock the coupling parts of the coupling device together.

SUMMARY OF THE INVENTION

An object of the present invention is to at least alleviate the aforementioned, or other, problem associated with the alignment of such coupling parts of coupling devices.

According to the present invention there is provided an alignment guide for aligning two parts of a coupling device, the first part of the coupling device, in use being provided on a vehicle and a second part of the coupling device being provided, in use, on a trailer or the like, the arrangement being such that, in use, the alignment guide is located on or adjacent one of the coupling parts in order to engage the other coupling part and guide it into position relative to the first coupling part as the two coupling parts are brought closer together.

Preferably, said alignment guide is in the form of a ramp and is arranged, in use, so that one of the coupling parts is able to ride up the ramp towards the other coupling part during alignment of said two coupling parts. Preferably, the alignment guide has wings or walls restraining the coupling part on the ramp from disengagement with the ramp and said wings or walls, preferably, taper, inwardly up the slope of the ramp, in order to guide the coupling part inwardly towards the narrowest part of the ramp as it rides up the ramp.

Usually the alignment guide will be provided with facility to align the coupling parts laterally as well as usually also in the height direction as the two coupling parts are brought closer together. As previously mentioned the alignment guide may be in the form of a ramp in order to accomplish this and the suspension of the vehicle will allow the height adjustment of the coupling parts to take place. The coupling parts may comprise or include a socket portion and a projection (a part-spherical projection) which can be received within the socket portion and preferably, the alignment guide aligns said projection in said socket portion.

Preferably, the alignment guide is removably attached to one of the coupling parts, usually the coupling part which is attached to the vehicle.

In one embodiment of the present invention the coupling part attached to the vehicle comprises a generally known form of towing bar having flanges provided with slots to receive locating flanges of the alignment guide (it is possible that the slots could be provided on the alignment guide co-operable with projecting flanges on the towing bar). Preferably, a generally vertically oriented carrying means or carrying plate is provided for carrying the alignment guide in a storage, non-operating position. The second coupling part may comprise a socket portion which engages a part-spherical portion of the towing bar, in use. Preferably, the alignment guide is arranged so that during alignment of the two coupling parts the socket is guided into a position immediately above the part-spherical portion and, preferably, as this position is obtained the alignment guide is adjusted in height relative to the towing bar so that part of said part-spherical projection enters the socket automatically as the two coupling parts are brought closer together. The alignment guide may have spring loaded catch means which co-operates with means on the towing bar (for example, heads of connecting bolts) to hold the alignment guide in two different height positions relative to the towing bar. The catch means may comprise two catches each including a recess which allows the alignment guide to drop to a second height position relative to the towing bar as the catches are rotated. Said catches may be rotated automatically by the engagement of said socket therewith during alignment of the coupling parts. Thus, the socket may act on angled receiving members of the catch means to rotate the catches against their spring biassing until the alignment guide is adjusted to its second relative height position. Said angled members may also include finger tabs which can be operated, by hand, once the alignment guide has been adjusted to its second position, thereby moving the catch means out of engagement with said co-operating means on the towing bar, thus enabling the alignment guide to be removed completely from the coupling device. The socket may be provided with a handle which is rotatable to lock the socket to the towing bar and, usually, the handle will be spring biassed to the locking position. Preferably, stop means is provided to hold the handle in an open position whilst the socket is aligned with the towing bar using the alignment guide.

Many advantageous features of the present invention will be evident from the following description and drawings.

BRIEF DESCRIPTION OF THE DRAWINGS

An embodiment of an alignment guide in accordance with the present invention, for aiding in aligning the respective coupling parts of a trailer/vehicle coupling device, prior to locking the two coupling parts together, will now be described, by way of example only, with reference to the following accompanying drawings in which:

FIG. 1 shows the alignment guide with first and second coupling parts of a vehicle/trailer coupling device shown in a first relative position to one another, in side view;

FIG. 2 shows a similar side view to FIG. 1 with the two coupling parts in alignment with one another;

DETAILED DESCRIPTION OF THE PRESENTLY PREFERRED EXEMPLARY EMBODIMENTS

Figure 3:
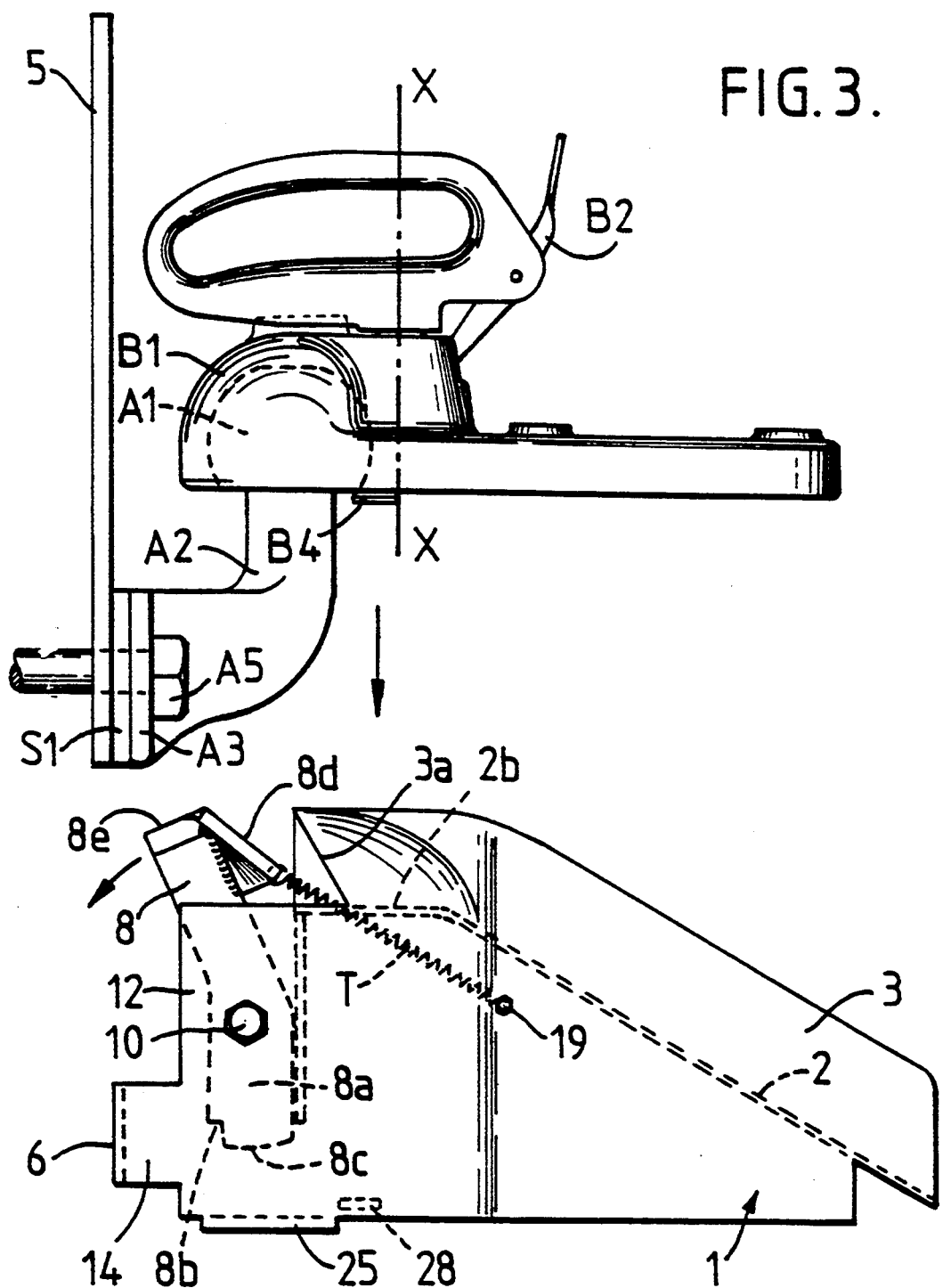
FIG. 3 shows, similarly, in side view, the two coupling parts locked to one another and the alignment guide removed from the coupling device.

Referring to the FIGURES of the drawings, an alignment guide 1 is adapted for attachment to a first coupling part C1 of a vehicle/trailer coupling device C1, C2. In the present example, the first coupling part C1 consists substantially of a known form of towing bar which is fixed to the rear of a vehicle (not shown) in a generally known manner. Coupling part C2 consists of a generally known coupling part which is attached to the front of a trailer or the like (not shown). The alignment guide 1 is removably attached to the coupling part C1 in a manner to be explained and aids in guiding coupling part C2 into correct alignment with coupling part C1 as the two parts C1,C2 are brought closer together, for example by reversing the vehicle up to the trailer.

As will be evident from the FIGURES of the drawings, the alignment guide 1 has a ramp 2 and tapered guide-wings or walls 3 which restrain the coupling part C2 from sliding off the ramp as it rides up the ramp into alignment with coupling part C1. The alignment guide 1 is provided with a relatively wide mouth 4 at the lowest end of the ramp 2 so that the coupling part C2 can be introduced onto the ramp as long as coupling part C1 remains generally opposite part C2, a considerable amount of lateral misalignment between the two coupling parts C1,C2 being possible initially. If the coupling part C2 is engaged by the ramp initially in such a manner that part C2 engages one of the wings 3, then, as the coupling part C1 is brought closer to part C2 (for example by reversing the vehicle) coupling part C2 will also ride against the associated side wing 3 (as well as riding on ramp 2) and will be moved inwardly along the taper of the wing 3 into the appropriate alignment position as it also rides up the ramp 2, in a manner which should be generally self-evident from the drawings.

Coupling part C1 consists of a generally known towing bar having a part-spherical upper portion A1 supported by a generally L-shaped limb A2 integral with side flanges A3,A4, said side flanges being provided with holes receiving bolts A5,A6 which pass through said flanges and into the body of the vehicle in order to secure the towing bar C1 to the vehicle. The bolts can be retained to the vehicle body by means of nuts (not shown) threaded onto the ends of the bolts. The coupling part C1 differs from the usual form of towing bar in two ways. Firstly, a vertically oriented rear carrying plate 5 is provided for carrying the alignment guide 1 in a storage position (see FIG. 5) and secondly the flanges A3,A4 are cut-away at the rear to form slots S1,S2 to receive location flanges 6 and 7 of the alignment guide 1 (see FIG. 5) in a manner to be explained later. The carrying plate 5 is bolted onto the vehicle by means of the bolts A5,A6 passing through appropriately arranged holes in the plate, said plate being clamped between a body part (not shown) of the vehicle and the flanges A3,A4 of the towing bar C1.

Figure 4:
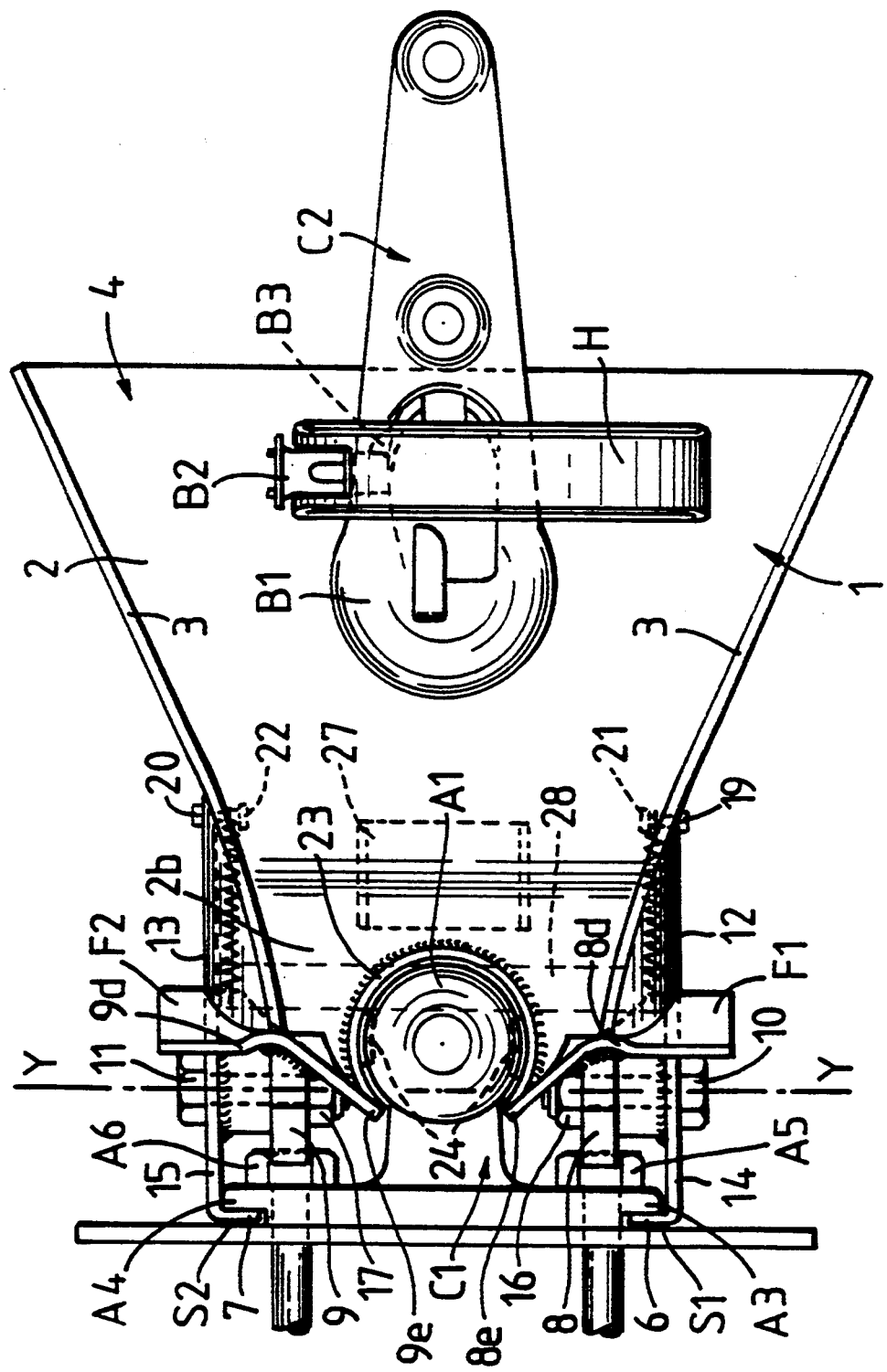
FIG. 4 shows a plan view of the arrangement shown in FIG. 1.

Coupling part C2, located on the trailer or the like, is generally of known form and has a socket portion B1 which, in use, engages ramp 2 of the alignment guide 1 and which can be guided into the correct alignment position in relation to part-spherical top A1 of the towing bar coupling part C1, and brought into snug-fitting relationship with said part A1 (which part A1 is received into a matching recess of the socket B1). Once the part-spherical top A1 has been fully received into socket B1 said socket can be locked to the part-spherical top as shown in FIG. 3 of the drawings. Coupling part C2 is provided with a handle H of known form, which handle can be rotated about vertical axis X—X to lock or unlock the socket B1 to the part-spherical part A1. The handle H is rotatable about axis X—X through 90° only (see FIGS. 1 and 3 for the extreme rotational positions of the handle H) and is biased to the locked position shown in FIG. 3 by spring means (not shown). Spring loaded lever B2 locks the handle in the locked position in a generally known manner said lever being pivotable in the direction of arrow A (see FIG. 3) in order to release the handle from the locked position. However, since it is envisaged that coupling parts C1 and C2 will be alignable relative to one another simply by reversing the vehicle relative to the trailer (coupling part C2 being guided up the ramp and inwardly as necessary by one of the appropriate wings 3 into position) the handle H needs to be mechanically held out of the locked position as shown in FIG. 3 and held in the fully unlocked position as shown in FIG. 1. Such a requirement is not normally necessary where coupling of the parts C1,C2 requires the attention of a person at the location of the coupling parts since that person holds the handle H in an appropriate position as the tow bar is manipulated into position. Therefore, in order to hold the handle H in the appropriate unlocked position a stop B3 (see FIG. 4) is provided, which stop B3 projects outwardly from the coupling part C2 and acts to hold the spring-loaded lever B2 from returning to the position shown in FIG. 3. It will be appreciated that the spring action acting to automatically return the handle H to the locked position is strong and, in any event, it is believed that this modification to coupling part C2 would prove to be a distinct advantage in coupling together parts C1 and C2 even without the use of the alignment guide 1. In practice it can sometimes be awkward to hold the handle out of the locked position whilst manoeuvering the coupling part C2 by means of the handle into the appropriate alignment position relative to part C1. Pressing the end of the lever B2 generally in the direction of arrow A when the handle is fixed in the unlocked position (i.e. as in FIG. 1) pivots the lower end of the lever B2 free of the stop B3 and allows the handle to be returned to the locked position under the strong spring action as aforesaid. It will be appreciated that in the locked position of the handle a part conical locking member B4 of known shape is locked in a position extending underneath the part-spherical top A1 of towbar coupling part C1, in such manner that the socket B1 cannot be lifted off part-spherical part A1, thereby locking coupling parts C1 and C2 together. However, in the unlocked position of the handle H (i.e. the position shown in FIG. 1) part-conical part B4 is rotated to a position out of the way of part-spherical part A1 in such a manner that the socket B1 could be lifted off the part A1.

The alignment guide 1 has locking flanges 6 and 7 which, as aforesaid, locate in slots S1 and S2 fashioned inbetween the flanges A3 and A4 of the coupling part C1 and the carrying plate 5. The alignment guide 1 is provided with two spring loaded catches 8 and 9 and the lower ends 8a,9a of the catches 8 and 9 co-operate with the heads of the bolts A5 and A6 in order to secure the guide to the coupling part C1. In fact, the catches 8 and 9 allow the alignment guide 1 to be secured to the coupling part at two different heights i.e. in two relative height-adjustment positions (as depicted in FIGS. 1 and 2). In order to achieve the two different height positions of the guide 1 relative to the coupling part C1 each catch 8,9 is provided with a rear recess or cut-away portion 8b,9b. As will be evident from FIG. 1, the curved lower surface 8c,9c of catches 8,9 engages the upper horizontal edge of the head of the associated bolt A5,A6 whereas in FIG. 2 the curved edge 8c,9c has dropped below said horizontal edge until said horizontal edge of the respective bolt has been engaged in the recess 8b,9b. The reason for providing the two different locking heights of the alignment guide relative to the coupling part C1 will be explained in more detail later.

The general form of the catches should be generally evident from the drawings. The catches 8,9 are pivotally mounted about a common axis Y—Y by bolts 10,11 which pass through the vertical side portions 12 and 13 at the rear of the alignment guide 1. Tabs 14 and 15 extend rearwardly of side portions 12 and 13 (and are of the same thickness) and are finally bent inwardly at 90° to result in the opposing locking flanges 6 and 7. Bolts 10 and 11 pass through holes in catches 8 and 9 and are secured thereto by nuts 16,17. The upper ends of catches 8 and 9 are provided with twisted or angled members 8d,9d and the lower ends of the angled members 8d, 9d are attached by long tension springs T to appropriate locations 19 and 20 on the side walls of the alignment guide, by means of pins 21 and 22 thus, angled members 8d,9d are spring-biased into contact with stops 3a provided on the upper rear ends of the wings 3. The ramp 2 of the alignment guide 1 ends in a horizontal section 2b which includes a part-annular recess 23 which in use surrounds or embraces the part-spherical portion A1 of coupling part C1. Radially inwardly directed stops 24 provided on the lower portion of the annular recess 23, in use, engage underneath the part-spherical top A1 of coupling part C1 in order to prevent the alignment guide 1 from being lifted off the coupling part C1. Angled members 8d,9d include rearwardly angled receiving member portions 8e, 9e which, in use receive the socket B1 of the coupling part C2 in a manner to be described.

Mode of Aligning Coupling Parts C1 and C2

The sequence of aligning socket coupling part C2 relative to part-spherical coupling part C1 is shown more particularly in three stages (i.e. FIGS. 1, 2 and 3). FIG. 1 shows in side view, coupling part C2 engaged by ramp 2 on the alignment guide (also see FIG. 4 for plan view). As the vehicle carrying coupling part C1 is reversed towards the coupling part C2, socket B1 rides up the ramp 2 as indicated by the arrow in FIG. 1. When socket B1 reaches the top of the ramp 2, the front of socket B1 engages angled receiving member portions 8e,9e and rotates catches 8 and 9 through a small distance in an anticlockwise direction about the axis Y—Y, against spring resistance provided by springs T. This pivotal movement of the catches is sufficient to allow the alignment guide 1, and thus the coupling C2 and in particular the socket B1 to drop slightly relative to the coupling part C1 and in particular relative to the part-spherical head A1. In this manner, the coupling part C2 is aligned and positioned over coupling part C1 with the part-spherical top A1 partly located within the socket B1. Thus, the alignment guide 1 has dropped to the second height position (depicted in FIG. 2) with the catch recesses 8b,9b engaging the heads of the bolts A5,A6. Of course, the handle H has been held in the unlocked position by means of the lever B2 acting against stop B3 throughout the alignment process. Angled members 8d and 9d of the catches 8 and 9 extend outwardly beyond the side walls of the alignment guide in order to provide finger tabs F1 and F2 so that once the position has been reached as shown in FIG. 2, the driver of the vehicle can then vacate the vehicle and complete locking of the coupling part C2 to the coupling part C1 by removing the alignment guide. The alignment guide is removed by pressing on the finger tabs F1,F2, thus rotating catches 8 and 9 further anticlockwise in such a manner that the lower end portions 8a and 9a of the catches become free of the bolt heads A5,A6, thus allowing the alignment guide to drop free of the coupling device C1,C2 with the locking flanges 6 and 7 moving downwardly in slots S1,S2 until the alignment guide is no longer attached thereto, as shown more particularly in FIG. 3. In FIG. 3, the catches 8 are shown in a position with the angled members 8d free of the stops 3a, as would occur with finger pressure on the finger tabs F1,F2. On release of pressure of the finger tabs F1,F2 the springs T would return the catches to the position shown in FIG. 1. Once the alignment guide 1 has been removed from the coupling device C1,C2 lever B2 can be depressed so that it is free of stop B3 when it will automatically be returned to the locking position as shown in FIG. 3 with locking member B4 securely locking the two parts C1,C2 of the coupling device together.

Figure 5:
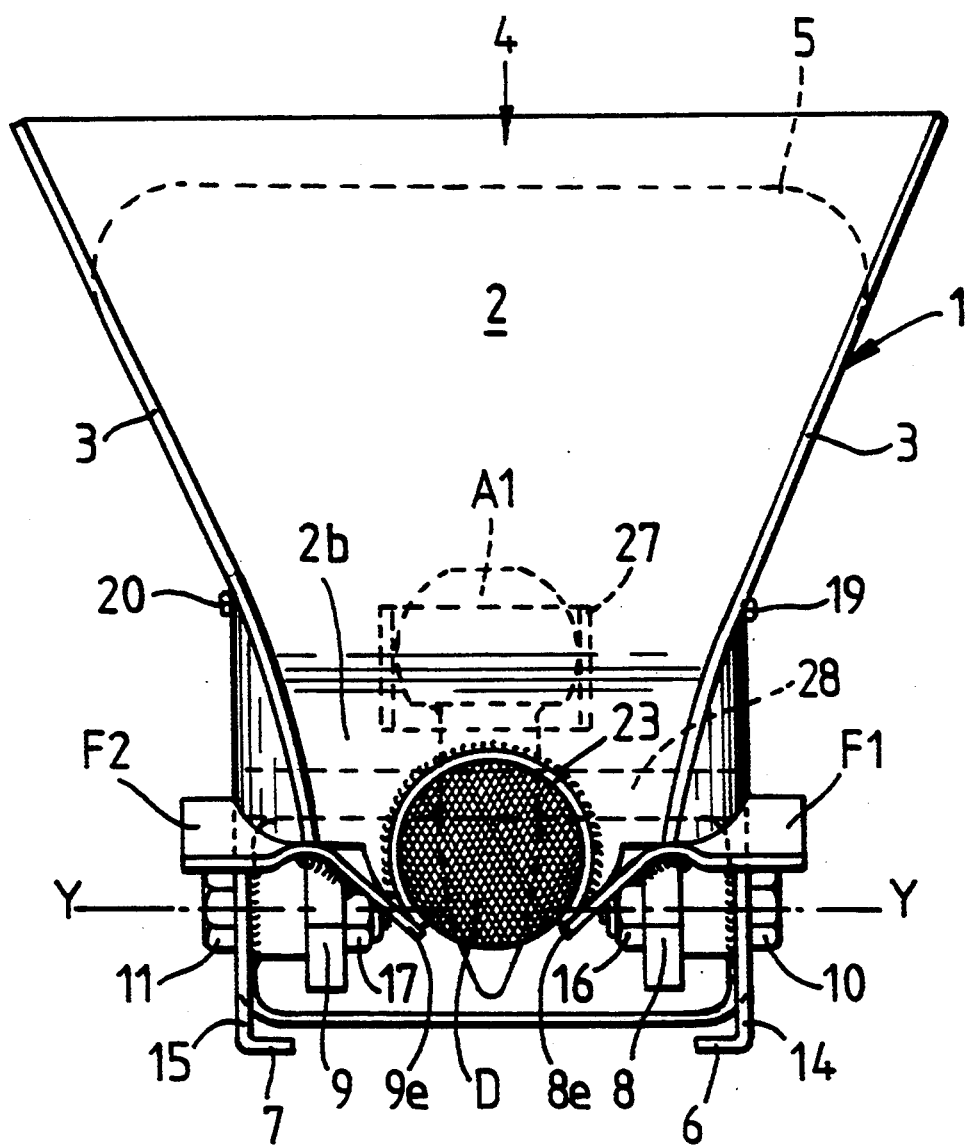
FIG. 5 shows a front view of one of the coupling parts with the alignment guide positioned in a storage position.

FIG. 5 shows a storage position for the alignment guide 1 on the coupling part C1 when the trailer is not connected to the vehicle. The alignment guide 1 rests on the carrying plate 5, which is of a similar tapered shape to the shape of the alignment guide 1 in plan view. In this position, tongues 25 and 26 on guide 1 engage in the vertical slots S1 and S2 and a circular collar portion 27 fits over the part-spherical head A1. Cross bar 28 engages on the rear part of the coupling part C1 in order to retain the alignment guide 1 in the storage position in a manner which should be self-explanatory. As an added feature, a reflective disc D can be engaged into the part-circular recess 23 in order to provide an added safety feature as well as providing an overall neater appearance and obscuring the coupling part C1 from view.

It is to be understood that the scope of the present invention is not to be unduly limited by the particular choice of terminology and that a specific term may be replaced or supplemented by any equivalent or generic term where sensible. It is to be appreciated that the present invention offers many improvements at least some of which might be patentable individually or in combination. Any individual feature as aforementioned or as shown or implicit herein or combinations thereof, or functions or methods appertaining thereto, may be patentably inventive and any specific term as used herein should not be construed as unnecessarily or unduly limiting. The singular may include the plural and vice versa where sensible.

It is to be appreciated that the alignment means could be utilised with different forms of coupling parts and that the alignment means could be fixed to a coupling part on a trailer rather than to a coupling part on a vehicle. Also, the alignment guide could include portions attached to each of the coupling parts.

Importantly, the alignment guide as described allows one of the coupling parts of the device to be adjusted in height against suspension means of the vehicle and/or trailer as one coupling part is brought closer to the other and advantageously, manhandling of heavily loaded coupling parts is avoided. It is believed that the present invention offers a much quicker and easier solution to coupling the trailer to a vehicle or indeed a caravan to a vehicle and there may be many other uses of the alignment guide in the coupling of two parts to one another, said parts not necessarily being provided on a vehicle or trailer. In the present instance the alignment guide acts as a guide which adjusts the height of one coupling part relative to the other correctly whilst it also adjusts the lateral position of said one coupling part relative to the other into alignment.

Embodiments of the present invention, advantageously, provide that the alignment guide can be readily removed (i.e. without the aid of a spanner or other tool) from the coupling part to which it is attached or from a region located adjacent to said coupling part.

I claim:

1. An alignment guide for aligning first and second coupling parts of a coupling device, one of said first and second coupling parts being disposed on a vehicle and another of said first and second coupling parts being disposed on a trailer, said guide comprising:

guiding means, disposed proximate to said first coupling part, for engaging said second coupling part and guiding said second coupling part to a position above said first coupling part as said first and second coupling parts move closer together, said guiding means including a ramp having an inclined portion and opposed side portions being fixed to and supporting the inclined portion, said opposed side portions extending along an inclination of the inclined portion, and being angled relative to the inclined portion; and positioning means for cooperating with said first coupling part to allow movement of the inclined portion and opposed side portions from a first height position in which the ramp supports the second coupling part to a second height position lower than said first height position relative to said first coupling part, and for thereby guiding said second coupling part into engagement with said first coupling part;

wherein an inclination of said inclined portion relative to the first coupling part is substantially identical in each of said first height position and said second height position.

2. The guide of claim 1, wherein said guiding means guides said second coupling part to said given position by riding said second coupling part up said ramp toward said first coupling part.

3. The guide of claim 1, further comprising attachment means for removably attaching at least one of said guiding means and said positioning means to said first coupling part.

4. The guide of claim 3, wherein said first coupling part is on said vehicle.

5. The guide of claim 1, further comprising attachment means for removably attaching at least one of said guiding means and said positioning means to a region proximate to said first coupling part.

6. The guide of claim 5, wherein said first coupling part is on said vehicle.

7. The guide of claim 1, wherein:
said first coupling part includes a towing bar;
said towing bar has flanges thereon;
said flanges have slots disposed therein; and
said guide further comprises flange means for engaging with said slots.

8. The guide of 1, wherein:
said first coupling part includes a towing bar;
said towing bar has flanges thereon; and
said guide further comprises slot means for engaging with said flanges.

9. The guide of claim 1 further comprising storage means for moving said guiding means from a guide operating position to a storage non-operating position proximate to said first coupling part.

10. The guide of claim 9, said storage means comprising carrying means, in a vertically-oriented position, for carrying said guiding means in a non-operating storage position.

11. The guide of claim 9, said storage means comprising carrying plate means for carrying said guiding means in a non-operating storage position.

12. The guide of claim 1, wherein:
said first coupling part includes a part-spherical portion of a towing bar;
said second coupling part includes a socket portion;
said guiding means guides said socket portion to an alignment position immediately above said part-spherical portion; and
said positioning means includes adjustment means for adjusting a height position of said guiding means relative to said towing bar and for causing said part-spherical portion to thereby enter said socket portion as said first and second coupling parts are brought closer together.

13. The guide of claim 1, said positioning means comprising spring-loaded catch means for, in cooperation with said first coupling part, selectively holding said guiding means in one of said two different height positions.

14. An alignment guide for aligning first and second coupling parts of a coupling device, one of said first and second coupling parts being disposed on a vehicle and another of said first and second coupling parts being disposed on a trailer, said guide comprising:

guiding means, disposed proximate to said first coupling part, for engaging said second coupling part and guiding said second coupling part to a given position relative to said first coupling part as said first and second coupling parts move closer together, said guiding means including a ramp having an inclined portion and fixed, opposed side portions; and spring-loaded catch means for, in cooperation with said first coupling part, selectively positioning said guiding means in one of a first height position in which the guiding means supports the second coupling part, and a second height position lower than said first height position relative to the first coupling part, and for thereby guiding said second coupling part into engagement with said first coupling part, said catch means having two rotatable catches which each include a recess allowing said ramp to drop to a second height position relative to the first coupling part as said catches rotate.

15. The guide of claim 14, wherein said catch means is for rotating said catches automatically due to engagement of the second coupling part.

16. The guide of claim 15, at least one of said catches including an angled receiving member which rotates said at least one catch against a spring bias until said ramp is adjusted to said second relative height position.

17. The guide of claim 16, said angled receiving member including finger tabs means for being operated when said ramp has been adjusted to its second position to move said catch means out of engagement with said first coupling part and to enable said alignment guide to be removed completely from said first coupling part.

18. The guide of claim 15, wherein said second coupling part includes handle means for rotating to lock said second coupling part to said first coupling part.

19. The guide of claim 18, wherein said handle means is spring biased to a position in which said first and second coupling parts are locked.

20. The guide of claim 18, further comprising stopping means for holding said handle in an open position while said first and second coupling parts are being aligned with said alignment guide.

21. An alignment guide for aligning first and second coupling parts of a coupling device, one of said first and second coupling parts being disposed on a vehicle and another of said first and second coupling parts being disposed on a trailer, said guide comprising:

guiding means, disposed proximate to said first coupling part, for engaging said second coupling part and guiding said second coupling part to a position above said first coupling part as said first and second coupling parts move closer together, said guiding means including a ramp having an inclined portion and opposed side portions being fixed to and supporting the inclined portion, said opposed side portions extending alone an inclination of the inclined portion, and being angled relative to the inclined portion; and spring-loaded catch means for, in cooperation with said first coupling part, holding said guiding means in one of a first height position in which the guiding means supports the second coupling part, and a second height position lower than said first height position relative to the first coupling part.

22. The guide of claim 21, wherein:
said first coupling part includes a part-spherical portion of a towing bar; and
said second coupling part includes a socket portion.

* * * * *